US008458207B2

(12) United States Patent
Kumar et al.

(10) Patent No.: US 8,458,207 B2
(45) Date of Patent: Jun. 4, 2013

(54) USING ANCHOR TEXT TO PROVIDE CONTEXT

(75) Inventors: Girish Kumar, Redmond, WA (US); Gaurav Sareen, Bellevue, WA (US); Namita Gupta, Kirkland, WA (US); Charles Lester Alexander Clark, Ontario (CA); Junhua Wang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 98 days.

(21) Appl. No.: 11/522,227

(22) Filed: Sep. 15, 2006

(65) Prior Publication Data

US 2008/0071739 A1   Mar. 20, 2008

(51) Int. Cl.
G06F 17/30 (2006.01)
G06F 7/00 (2006.01)

(52) U.S. Cl.
USPC ........... 707/769; 707/706; 707/722; 707/726; 707/748

(58) Field of Classification Search
None
See application file for complete search history.

(56) References Cited

U.S. PATENT DOCUMENTS

| | | | | |
|---|---|---|---|---|
| 5,724,595 | A * | 3/1998 | Gentner | 715/206 |
| 6,625,644 | B1 * | 9/2003 | Zaras | 709/217 |
| 6,651,059 | B1 * | 11/2003 | Sundaresan et al. | 707/6 |
| 6,895,551 | B1 * | 5/2005 | Huang et al. | 715/205 |
| 6,925,595 | B1 * | 8/2005 | Whitledge et al. | 715/234 |
| 7,051,023 | B2 | 5/2006 | Kapur et al. | |
| 7,260,573 | B1 * | 8/2007 | Jeh et al. | 707/708 |
| 7,499,913 | B2 * | 3/2009 | Kraft et al. | 1/1 |
| 7,711,732 | B2 * | 5/2010 | Pedersen et al. | 707/726 |
| 7,716,199 | B2 * | 5/2010 | Guha | 707/706 |
| 7,739,277 | B2 * | 6/2010 | Meyerzon et al. | 707/726 |
| 7,792,827 | B2 * | 9/2010 | Amitay et al. | 707/726 |
| 8,046,357 | B2 * | 10/2011 | Gulli et al. | 707/726 |
| 8,321,278 | B2 * | 11/2012 | Haveliwala et al. | 705/14.66 |
| 2004/0064438 | A1 * | 4/2004 | Kostoff | 707/1 |
| 2005/0149576 | A1 * | 7/2005 | Marmaros et al. | 707/200 |
| 2005/0149851 | A1 * | 7/2005 | Mittal | 715/501.1 |
| 2005/0165781 | A1 * | 7/2005 | Kraft et al. | 707/7 |
| 2006/0026496 | A1 * | 2/2006 | Joshi et al. | 715/500.1 |
| 2006/0031195 | A1 | 2/2006 | Patterson | |
| 2006/0074871 | A1 | 4/2006 | Meyerzon et al. | |
| 2006/0074910 | A1 | 4/2006 | Yun et al. | |
| 2006/0122968 | A1 | 6/2006 | Naam | |
| 2006/0129910 | A1 | 6/2006 | Djabarov | |
| 2006/0143158 | A1 | 6/2006 | Ruhl et al. | |
| 2006/0143254 | A1 | 6/2006 | Chen et al. | |

OTHER PUBLICATIONS

Robert Armstrong, "WebWatcher: A Learning Apprentice for the World Wide Web," Feb. 1, 1995, Carnegie Mellon University, School of Computer Science, pp. 1-7.*
Brin, et al., "The Anatomy of a Large-Scale Hypertextual Web Search Engine", http://www-db.stanford.edu/pub/papers/google.pdf.
Kraft, et al., "Mining Anchor Text for Query Refinement", Date: May 17-22, 2004, http://www2004.org/proceedings/docs/1p666.pdf.
Wu, et al., "Undue Influence: Eliminating the Impact of Link Plagiarism on Web Search Rankings", Date: Apr. 23-27, 2006, http://delivery.acm.org/10.1145/1150000/1141535/p1099-wu.pdf?.
Yates, et al., "Web Page Ranking using Link Attributes", Date: May 17-22, 2004, http://www2004.org/proceedings/docs/2p328.pdf.

* cited by examiner

*Primary Examiner* — Jung Kim
*Assistant Examiner* — James J Wilcox

(57) ABSTRACT

A search engine can provide referencing information as context for a particular search result when an excerpt from the search result, comprising at least some similar elements to the user's query, is not generated. Referencing information can include one or more anchor texts having similarity to at least some elements of the user's query, the anchor texts being used by referencing pages to link to the page returned as a search result. User selection of the anchor text can enable the user to visit a referencing page using that anchor text to link to the page returned as a search result, and having a high static rank.

20 Claims, 6 Drawing Sheets

USING ANCHOR TEXT TO PROVIDE CONTEXT

BACKGROUND

The core of the World Wide Web (WWW) comprises several billion interlinked web pages. Accessing information on almost any of these web pages would be essentially impossible without the aid of systems that enable a user to search for specific text, or textual identifiers. Indeed, such systems, generally known as "search engines," have increased in popularity as the WWW has grown in size.

Traditionally, a search engine comprises an initial page providing the user with a mechanism for entering one or more words, characters, or phrases, known as the "search string" or the user's "query." The search string represents the words, characters or phrases that the user wishes to find in one or more of the web pages that comprise the WWW. The search engine will then reference a database comprising the content of a myriad of web pages, seeking to identify one or more web pages that contain the search string that the user entered. More advanced search engines can also apply common linguistic permutations to the words or phrases that the user is searching for in an effort to provide a more complete result. Thus, if the user searched for the word "computers," the search engine could also search for the singular form "computer," or even the verb form "computing," so as not to exclude, for example, a web page referencing a single "computer" but not multiple "computers."

To generate a database which can be searched for the user's search string, search engines commonly employ automated processes known as "crawlers" to read information from a web page, follow one of the links in the web page to another web page, read information from that web page, and so forth until the crawler reaches a web page that comprises no links, in which case the crawler can return to a prior, linking, web page and proceed with a different link. In such a manner, the crawler traverses web pages of the WWW in an orderly manner, returning the information from the web page back to the search engine for storage. The search engine then stores the information in an optimized format to reduce the amount of storage space used, and to improve searching efficiency.

The search results that are generated by a search engine in response to a user's entry of a search string are generally presented to the user in the form of a series of links to the web page determined relevant to the user's query. Clicking on any of the links will enable the user to visit the web page identified by the search engine. However, to avoid requiring the user to click on each result, a search engine can also provide a short excerpt from the web page, illustrating to the user how the search string is used in the web page. A user can then obtain some context information without clicking on each result.

SUMMARY

Many web pages do not contain any text, or contain very little text, that can be read by a search engine crawler. For example, a web page can embed a programmatic element, commonly referred to as a "control," to dynamically display content that, while presenting words on the screen for the user, does not comprise data in a textual format. In such a case, traditional search engines would not display any excerpt, as none could be obtained from the web page by the crawler.

A web page without content in a textual format could, nevertheless, be relevant to a user's query. One mechanism for determining the relevance of a particular web page to various search terms is to track the terms used by other web pages to refer to that web page. Consequently, the original web page need not have any content in a textual format in order to be considered relevant to a user's query. Indeed, the search engine may provide a web page as a result, not because that web page itself contains any of the terms of the search string, but rather because one or more other web pages reference the result web page using terms from the search string. In such a case, no excerpt could be displayed to the user because, while the web page selected as a search result may or may not comprise some text, that text does not include the terms of the user's query.

As used herein the term "page" is meant to include any presentation of information that is intended to be considered as a whole. Thus, while a "web page" is one common type of "page" the term "page" is not intended to be limited to documents in the Hyper-Text Markup Language (HTML). Instead, the term "page" is meant to include both HTML documents and documents and subsections of documents in other formats, including, but not limited to, word processing document formats, spreadsheet document formats, animation, audio or video document formats, presentation software formats and universal (or "portable") document formats. The elements used by one page to reference another will be termed herein as "anchor text," though, as described below, the use of the term "text" is not meant to limit the description to text-based formats. In a linked environment, such as the WWW, a link to another page can be represented on the linking page as one or more textual characters, generally identified via font, color, underlining, bolding or some combination thereof, or other non-textual elements, including images, graphics or other data. The visual representation of the link from one page to another is the "anchor text", and can often provide the reader of the linking page with some information about the linked-to page. For example, the anchor text "computer" in one page would likely link to another page that had at least some connection to the term "computer." Thus, search engines can deem a page relevant to a user's query simply because one or more other pages reference that page by using anchor text that is similar, or identical, to the user's query. The page deemed relevant to the user's query under such a system, however, may not itself contain the user's query.

To avoid user confusion, and to provide context for the results generated by the search engine, additional information can be provided to the user in conjunction with the links to the pages deemed relevant by the search engine. More particularly, a page that is determined to be relevant to the user's search term because of the anchor text in other pages that links to that page, can be presented by including that anchor text. In one embodiment, if the page that comes up as a search result has no information that can be excerpted, then the anchor text linking to that page can be displayed. In an alternative embodiment, if the page that comes up as a search result does have information that can be excerpted, or if it does have describing information that can be presented, then such information can be displayed in addition to the anchor text from the referring page or pages that contains elements of the user's query. In yet another alternative embodiment, the anchor text can itself include excerpts to provide additional context.

To more efficiently determine which referencing text and page to display, together with the search result page that is being referenced, the referencing information can be compiled and stored. A crawler mechanism can provide both the information from the crawled page, and the anchor text to the crawled page from a prior page. Upon amalgamating the information from multiple crawler mechanisms, multiple anchor texts to a single page may be identified. Such anchor texts can be sorted based on their specific wording. In many cases, multiple pages may refer to a referenced page using identical anchor tag wording. For each wording, a determination can be made of the "static rank" of the pages using that exact wording to refer to the referenced page, where the "static rank" of the page is the score, rank or other numerical value that is assigned by a search engine to a page independently of any specific user query. The average static rank of all such pages, and the maximum static rank of such pages can be used to identify common anchor text wording for a particular referenced page. In one embodiment, several most common anchor text wordings, together with additional information, can be stored with the referenced page.

Once a user enters a particular search string, the result pages can be identified by the search engine. For each result page that is to be displayed to the user, a determination can be made whether a suitable excerpt from the page can be provided. If a suitable excerpt cannot be provided, some descriptive information or excerpt can be provided and, in addition, referencing information, including the anchor text, can be provided illustrating the use of some or all of the search string on pages referring to the result page.

The specific anchor text wording provided can be selected based on one or more factors. More particularly, the anchor text wording can be selected from among the several most common anchor text wordings that would have been stored with the result page. Factors that can be considered include the number of terms which the anchor text shares with the search string and the overall similarity of the anchor text to the search string. Additional factors include the language of the anchor text as compared to the search string and the results page, and the length of the anchor text. Still further factors can be based on the static rank of the pages that contain the anchor text. Once the anchor text wording is selected, the page to which the user will be connected if they select the anchor text from the search results page can be selected based on similar factors, or it can simply be the page with the highest static rank that uses the anchor text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
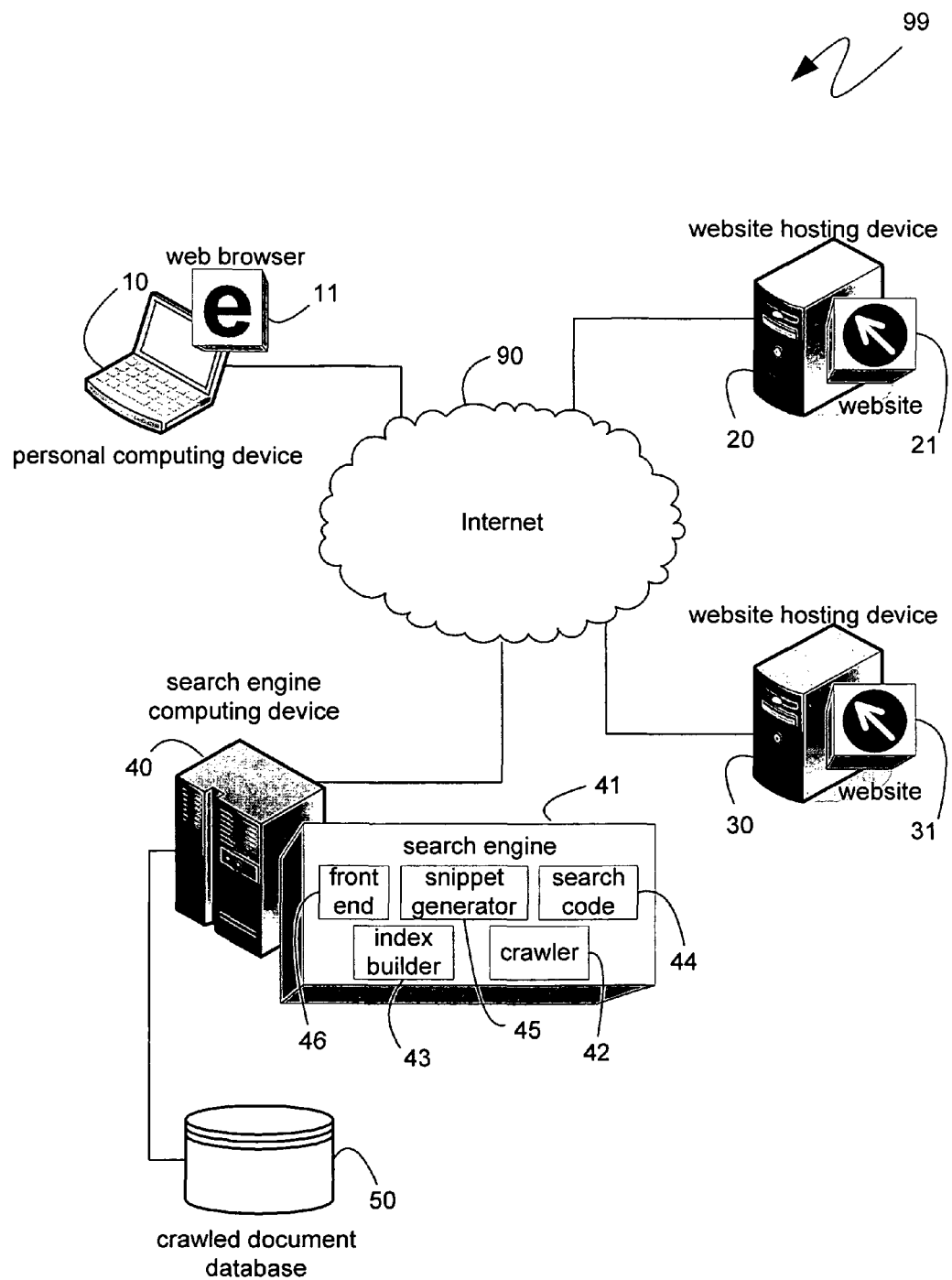
FIG. 1 is a diagram of an exemplary system that provides context for the described functionality.

The following description relates to providing additional context for search results. In one embodiment, pages that either have no text, or whose text does not contain the search terms, may have been selected and presented as search results because they are referred to by other pages in a manner that uses one or more of the search terms. In such cases, the user can be presented with the referencing information, including the anchor text, in order to relate the user's query to the result. In addition, the anchor text can be presented as a link to one or more referencing pages using that anchor text should the user wish to visit those pages. In an alternative embodiment, such referencing information can be presented even if the search result pages do have some or all of the search terms. In such a case, the referencing information can provide further context.

The techniques described herein focus on the determination of when to display referencing information and what referencing information to display. In one embodiment, the referencing information displayed comprises the anchor text used to link to the page being presented as a search result. In another embodiment, the referencing information comprises the anchor text and additional excerpts from the referencing page. The anchor text displayed can be selected based on one or more factors that include, but are not limited to, the length of the anchor text, the static rank of pages using the anchor text, including the average static rank of those pages and the maximum static rank, the similarity of the anchor text wording to the query wording, including the number of terms they have in common and their respective languages, the differences between the anchor text, the query wording and the results page, and other factors.

The determination of when to display referencing information can, in one embodiment, be based on the ability to obtain an excerpt from a search result page that comprises at least some of the search string. In another embodiment, the referencing information can be displayed even if information about the search result page is displayed instead of an excerpt from the page. To render the display of the referencing information more efficient, specific anchor text wordings, and other referencing information can be stored together with the page that is being referenced. In one embodiment, the specific anchor text wordings are selected for storage based on one or more factors, including, but not limited to, the number of times the specific anchor text wording is used in the referring page, the average static rank of all of the pages using that specific anchor text wording, and the maximum static rank out of all of those pages.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 99 is illustrated, providing context for the descriptions below. The exemplary system 99 can be part of the Internet 90, as illustrated, though the reference to the Internet is strictly an example and is not intended to limit the descriptions to Internet protocols, such as the Transmission Control Protocol (TCP), the Internet Protocol (IP), or any other Internet-specific technology. Exemplary system 99 includes a personal computing device 10 and website hosting computing devices 20 and 30 connected to the Internet 90. Each of the website hosting devices 20 and 30 hosts a website 21 and 31, respectively, which can be browsed from the personal computing device 10 with a web browser 11. More precisely, the various web pages of websites 21 and 31 can be read and displayed by web browser 11. As will be known by those skilled in the art, the collection of websites hosted by computing devices connected to the Internet 90 is commonly referred to as the World Wide Web. However, as with the reference to the Internet itself, the reference to the World Wide Web is strictly exemplary and is not intended to limit the descriptions to HTTP, HTML, or any other World Wide Web-specific technology.

Also illustrated in FIG. 1 is a search engine computing device 40 which hosts a search engine 41. The search engine 41 comprises a number of interrelated components, including one or more crawlers, such as crawler 42, an index builder 43, search code 44, a snippet generator 45, and a front end 46. As indicated previously a crawler, such as crawler 42, obtains information from a page, such as a web page hosted by website 21 or 31, identifies links to other pages that are contained on that page, and then follows one or more of those links to other pages whereupon the process is repeated. The information gathered by crawler 42 is returned to the search engine 41, where it is used by the index builder 43, or similar component, to create or update an appropriately structured database stored in the crawled document database 50. In one embodiment, the index builder 43 aggregates the information from multiple pages into storage elements that are stored in the database 50. The aggregated information includes, not only the information from the pages themselves, but also metadata, including, for example, the anchor text used by other pages to link to the pages being stored.

The user, such as a user of web browser 11 on personal computing device 10, can provide a search string to the search engine 41 through the front end 46, which comprises both the initial page enabling a user to enter search terms, and subsequent pages that are generated with some or all of the results. Upon receiving a search string, the search code 44 can search through the database 50 and identify the pages that are relevant to the search string. In addition, the search code 44 can also rank the identified pages such that those pages deemed most relevant would be the first to be presented to the user. The snippet generator 45 can likewise search the database 50 and identify, for each page deemed relevant by the search code 44, an excerpt from that page illustrating the page's relevance. Such excerpts can be presented to the user via the front end 46 and are commonly referred to as "snippets."

Figure 2:
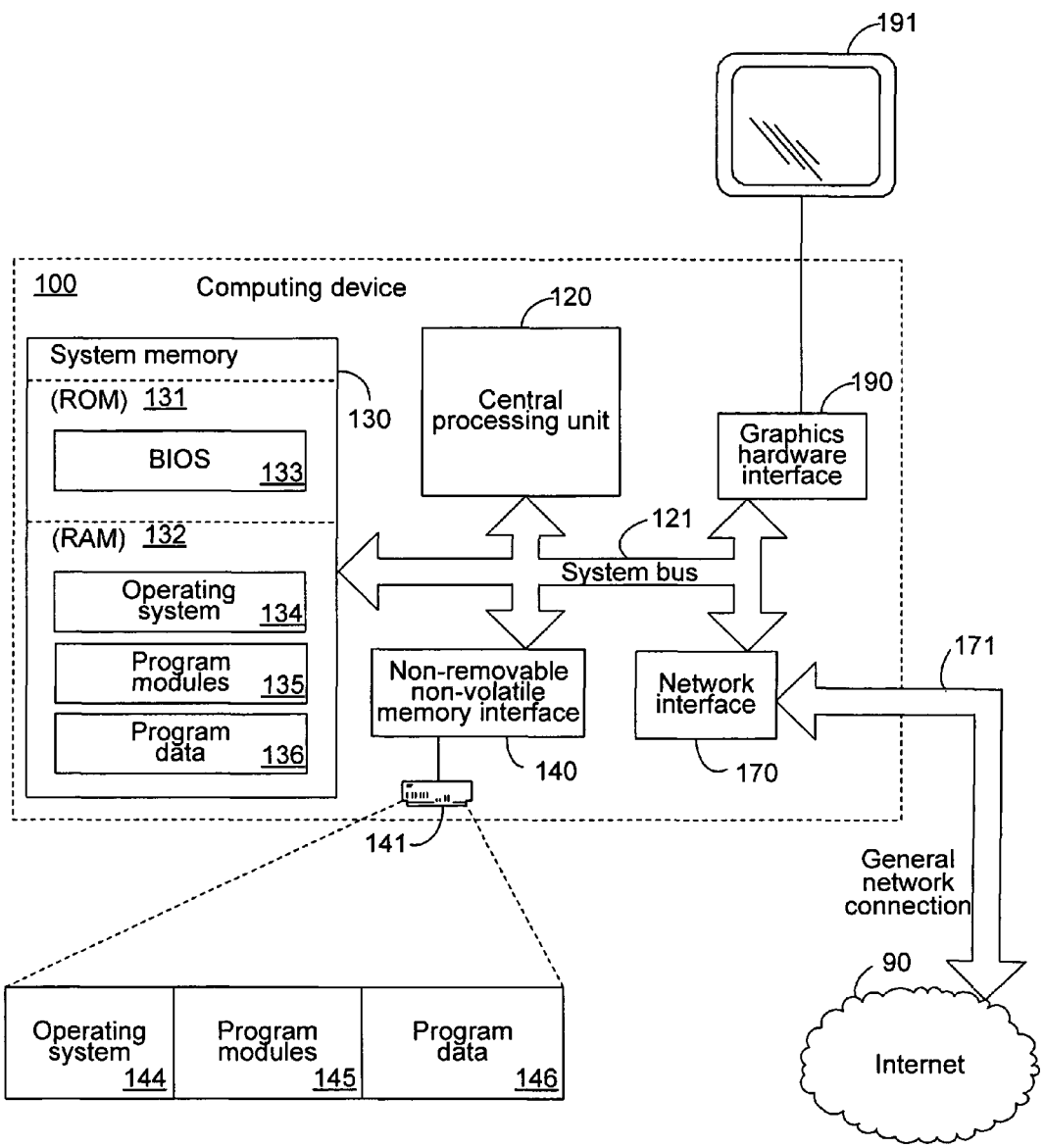
FIG. 2 is a block diagram of an exemplary computing device.

Turning to FIG. 2, an exemplary computing device 100 is illustrated. Any of the computing devices of system 99 shown in FIG. 1 can be of the form of the exemplary computing device 100, including the personal computing device 10, the website hosting devices 20 and 30, and the search engine computing device 40.

The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include the Peripheral Component Interconnect (PCI) bus and various higher speed versions thereof, the Industry Standard Architecture (ISA) bus and Enhanced ISA (EISA) bus, the Micro Channel Architecture (MCA) bus, and the Video Electronics Standards Associate (VESA) bus. The computing device 100 can optionally include graphics hardware, including, but not limited to, a graphics hardware interface 190 and a display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, and in conformance with the exemplary system 99 of FIG. 1, the computing device 100 is shown in FIG. 2 to be connected to the Internet 90. However, the computing device 100 is not limited to any particular network or networking protocols. The logical connection depicted in FIG. 2 is a general network connection 171 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
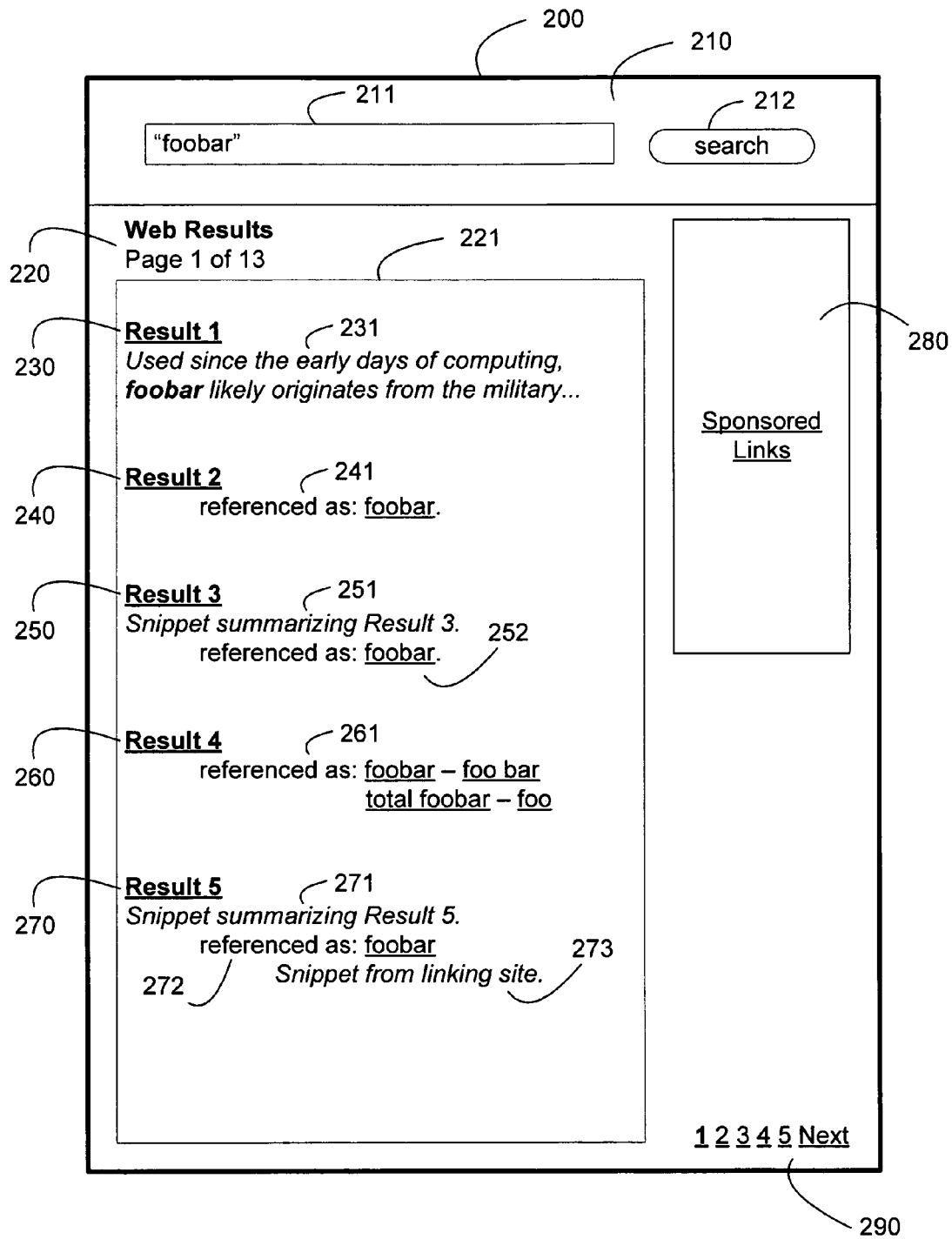
FIG. 3 is an example of a rendered web page providing search results.

As indicated previously, network communication between a user and the search engine 41 occurs via pages generated by the front end 46 and displayed for the user by web browser 11. Turning to FIG. 3, an exemplary web page 200 displaying search results is shown. The exemplary web page 200 is visually subdivided into multiple segments, including a search area 210 for entering search strings, a results area 221 for displaying the results of a search, a sponsored links area 280 for displaying advertisements or purchased search results, and a navigational area 290 for selecting one of possibly multiple pages of search results. Included in the search area 210 can be an entry field 211 for receiving the search string from the user, and a search initiation button 212 to enable the user to request a search of the entered string. The results area 221 can be prefaced with a guide 220, which can comprise a title and an indication of the current page and the total number of pages of search results.

FIG. 3 illustrates a series of search results 230, 240, 250, 260 and 270, each representing one or more pages deemed relevant to the search string, and each illustrating a contemplated embodiment. Focusing on search result 230, the search result 230 is a link to a page deemed relevant, by the search code 44, to the query entered into field 211. In addition to search result 230, a snippet 231 is also provided to illustrate at least one example why the particular page was deemed relevant to the search string. In the exemplary web page 200 shown in FIG. 3, the search string "foobar" was searched for, and the resulting page, identified by result 230, contained the text of snippet 231, including the search term "foobar," which is highlighted for the user in bold text.

Some pages, however, have no text at all, or no text that contains the search string. For example, some pages can be mostly comprised of embedded controls that, while they may present user-visible text when the page is viewed by the user, do not comprise information such as could be read and understood by the crawler 42. Nevertheless, such pages may be deemed relevant to the search string because other pages use anchor text similar, or identical, to the search string to refer to those pages. Search result 240 illustrates an example of such a page, containing no text in common with the search string. In such a case, as will be described further below, the snippet generator can attempt to generate a query-independent snippet. However, such a snippet may not convey sufficient information to explain to the user why the page was deemed relevant to the user's search. In the case illustrated in FIG. 3, the snippet generator was not able to generate a query-independent snippet. Consequently, all the user would see from a conventional search engine would be the mere search result 240. Further confusing the user, should the user select the link and browse to the page identified by search result 240, the user might not find the terms that the user had searched for, since the page was deemed relevant based on the anchor text used by other pages to link to it.

However, as illustrated in FIG. 3, referencing information 241 can be provided in addition to the search result 240, illustrating to the user the connection between their search string and the selection of the page identified by result 240. In particular, the referencing information 241 can comprise the anchor text that was used to refer to the page identified by result 240. As can be seen from the example of FIG. 3, and as will be described further below, such anchor text is likely to be at least similar, if not identical to the search string. In addition, the anchor text can be presented as a link to the page containing the anchor text, much as the result 240 is presented as a link to the page deemed relevant to the search string. Consequently, the user can click on the anchor text of referencing information 241 and browse the referencing page, thereby seeing the usage of the user's search string, or similar wording, as the link to the page that was provided to the user as search result 240.

As indicated above, if the query text is not present in the page deemed relevant to the search result, the snippet generator can attempt to generate a query-independent snippet. Search result 250 of FIG. 3 illustrates an example in which such a query-independent snippet, namely snippet 251, was able to be generated. Despite the presence of such a snippet, in one embodiment, referencing information 252 is still provided to the user. Because none of the search terms were found in the page presented as search result 250, it is likely that the query-independent snippet, while an accurate representation of the page, may not be helpful to the user. Query-independent snippets generally comprise titular information or the address of the page. Thus, for example, the main page for a company's site could result in a query-independent snippet that recites the company's name, or provides the address of the page, such as www.company.com. Without further context, however, it is likely that the user may not recognize the connection between the page and the search terms. Consequently, referencing information 252 can be provided in a manner analogous to the provision of referencing information 241, described in detail above.

The representation associated with search result 250 can also be used to present referencing information 252 even if the snippet 251 contained one of the search terms. For example, a search for a person's first and last name may yield a result 250 where the person's first name is used in the page, and thus excerpted and provided as part of snippet 251, and the person's last name is used in a referencing page and is provided as referencing information 252. In such a case, the referencing information 252 can be selected to complement those elements of the search term that may already be present in the page identified as result 250.

An alternative embodiment, illustrated with search result 260, is to provide referencing information 261 comprising multiple anchor texts. As will be described in detail below, a web page may be commonly referenced by one of several different types of anchor text wordings. In such a case, two or more of the most relevant anchor text wordings can be displayed as part of the referencing information 261. Thus, as shown in FIG. 3, the page presented as search result 260 may have been referenced by the anchor text "foobar" and likewise by anchor texts "foo bar," "total foobar" and "foo." If appropriate, each anchor text can be displayed as part of the referencing information 261. As above, each anchor text can link to a referencing page that uses that anchor text wording to refer to the page identified by search result 260. Additionally, as will be clear to those skilled in the art, the term "wording" is not meant to limit the description to anchor text that comprises linguistic words, but rather is meant to encompass any uniquely identifiable collection of characters, images or other information stored as part of the page.

Another alternative embodiment is illustrated in connection with search result 270 of FIG. 3. Specifically, the referencing information 272 comprises, not only anchor text, but a snippet 273 from the referencing site as well. As with snippet 271, snippet 273 can be an excerpt from the page that uses the anchor text included in referencing information 272. In one embodiment, the snippet 273 can include additional wording around the anchor text included in referencing information 272 to provide greater context to the user.

As indicated previously, information obtained from the crawler 42 can be stored in an optimized fashion in the database 50 by the index builder 43. One such optimization can be the selection of select referencing information for the page being added to the database 50. As will be recognized by those skilled in the art, a web page that is part of the WWW may be referenced by thousands, or even millions, of other pages and such referencing is likely to include thousands of different anchor text wordings. Consequently, one embodiment contemplates the selection of select referencing information, such as frequently used anchor text wording, as part of the creation and maintenance of database 50.

Figure 4:
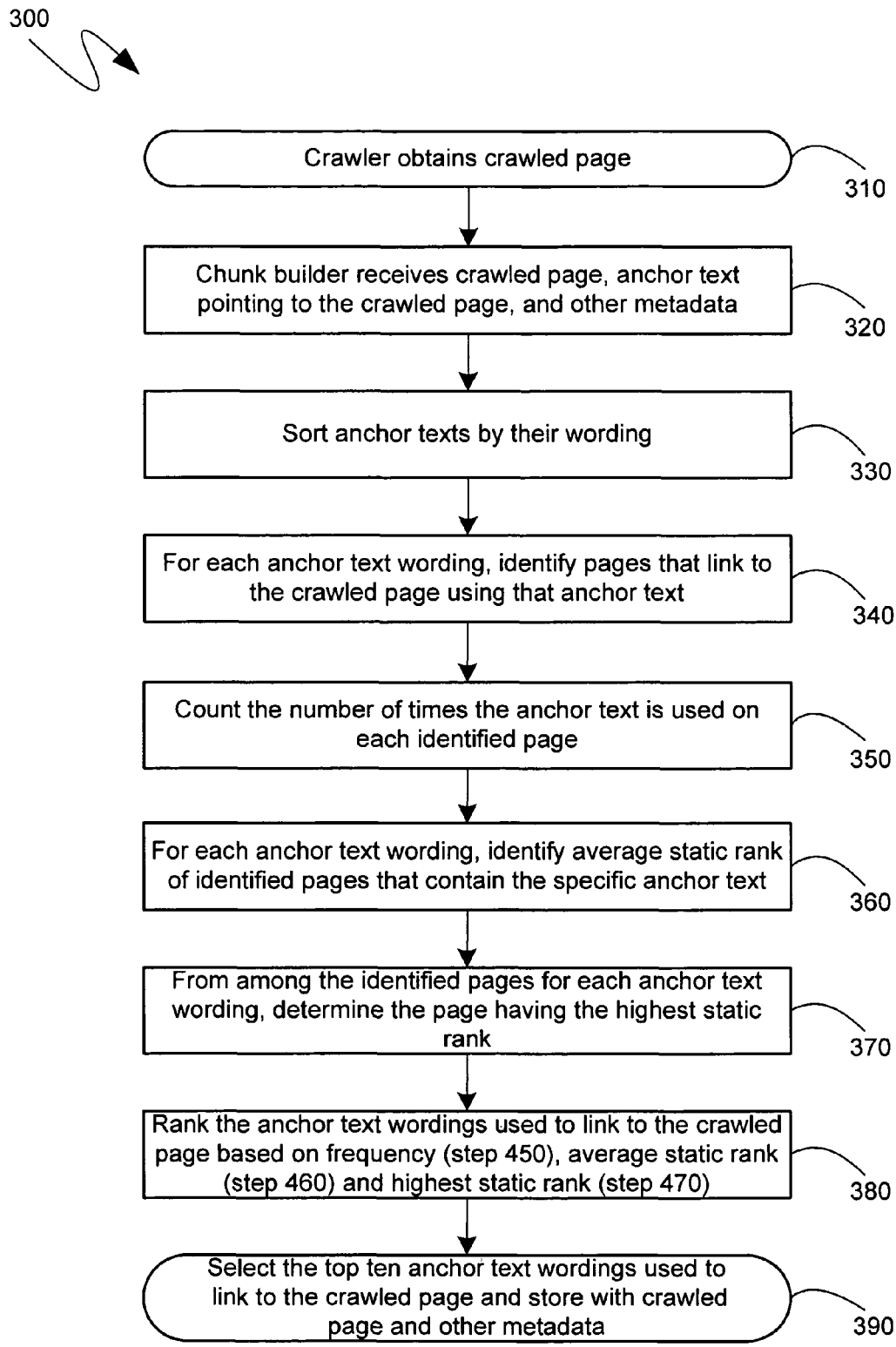
FIG. 4 is a flowchart illustrating an exemplary process for storing information.

Turning to FIG. 4, an exemplary flow diagram 300 is provided illustrating one mechanism for selecting and storing such select referencing information. At step 310, the crawler 42 reads the information from one or more pages that the crawler is visiting. At step 320, the index builder 43 receives the returned information that the crawler 42 sent back to the search engine 41. At step 330, customized code can initially sort the anchor texts that refer to a particular web page by their wording. Thus, as an example, considering the anchor texts displayed in referencing information 261, the anchor text "foobar" would be considered different anchor text wording from the anchor text "total foobar".

Once the anchor texts have been sorted according to the wording used in the anchor text, the various pages that use those anchor texts to refer to the page being stored can be identified and categorized accordingly, as shown in step 340. Thus, again using the example of referencing information 261, pages using the anchor text wording "foobar" would be sorted together, while pages using the anchor text wording "total foobar" would likewise be sorted together.

Once the pages have been appropriately split up, a number of factors can be considered to select the anchor text wording that will likely be most relevant. The flow diagram 300 illustrates one embodiment considering factors such as frequency and the static rank of a page. Thus, turning to step 350, for the pages using a particular anchor text wording, the number of times that that anchor text wording is used within one of those pages can be determined. Likewise, at step 360, again for the pages using a particular anchor text wording, the average static rank of those pages can be calculated. As will be known by those skilled in the art, the static rank of a page is a measure of the popularity of that page relative to other pages. And at step 370, again for the pages using a particular anchor text wording, the highest static rank from among those pages can be determined.

One or more of the collected factors, including the frequency determined at step 350, the average static rank determined at step 360, the highest static rank determined at step 370, and any other factors, can be weighed in ranking the anchor text wordings at step 380. In one embodiment, the frequency, average static rank, and highest static rank are each multiplied by a weighting factor that can be adjusted based on empirical evidence and summed. The anchor text wordings can then be sorted according to increasing (or decreasing) total values.

The select referencing information, which is to be stored with the web page to which the above anchor texts have been referring, can be selected from the foremost sorted anchor text wordings. In one embodiment, illustrated by step 390, the top ten anchor text wordings are stored together with the page to which those anchor texts refer. Other embodiments may store a lesser or greater number of anchor text wordings.

In addition to the anchor text itself, additional information can also be stored with the anchor text to enable more efficient determinations of which anchor text to display, as will be described in greater detail below. In one embodiment, along with the anchor text, the database 50 can contain: the frequency with which the anchor text is used among the pages using the anchor text, the highest static rank, minimum static rank and average static rank among the pages using the anchor text, and an encrypted address hash for the page having the highest static rank. As will be recognized by those skilled in the art, page address can be of widely varying lengths. To provide homogenous storage, the addresses can be hashed into values of fixed, predetermined size. To maintain the security of the hash, the hashed address can be encrypted, and subsequently decrypted once the user has selected an associated element on the results page.

Figure 5:
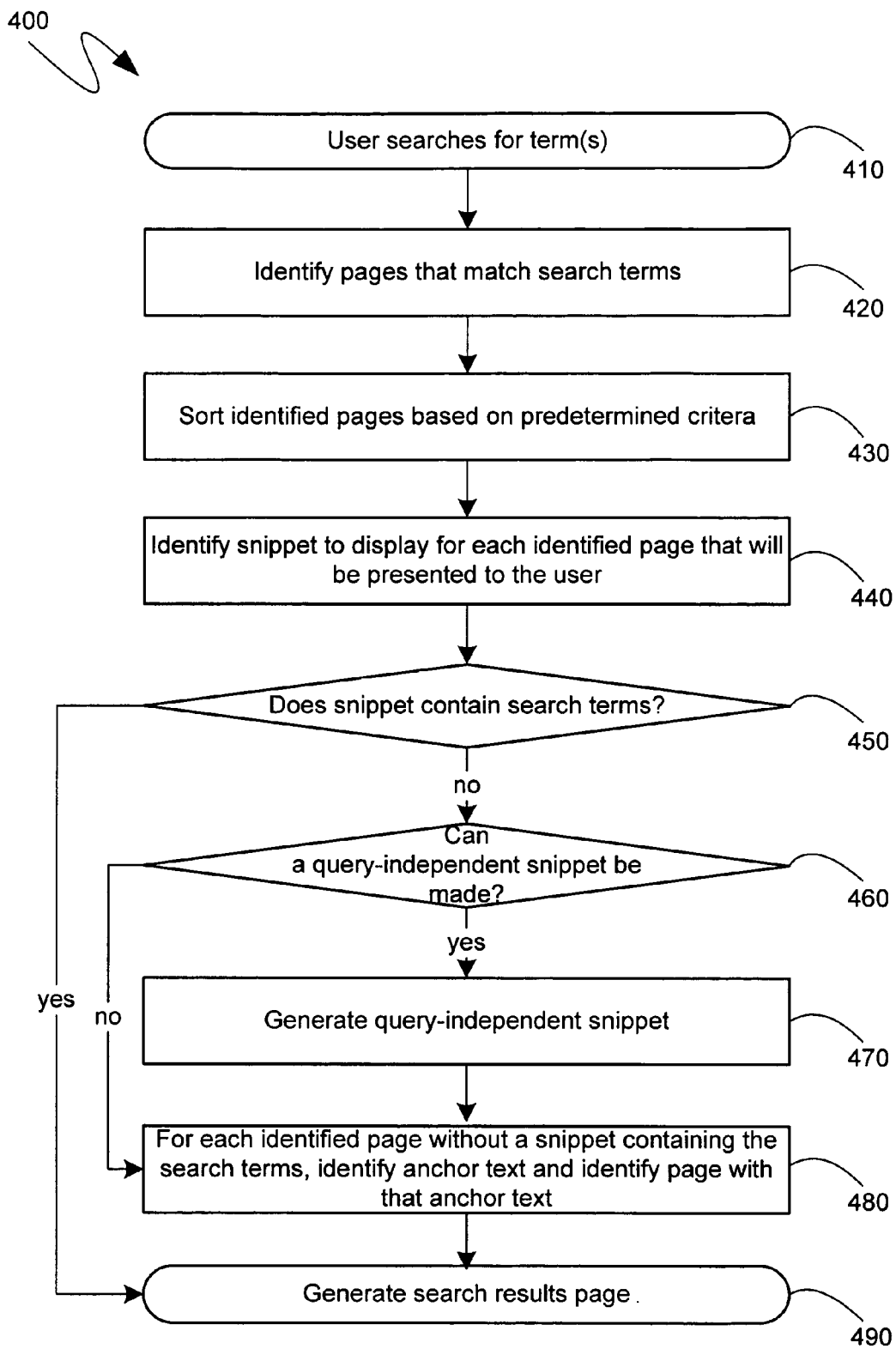
FIG. 5 is a flowchart illustrating an exemplary process for providing search results.

Once stored, the select referencing information can be used to identify the one or more anchor tags that can be presented when referencing information is provided to the user as part of the search results. Turning to FIG. 5, a flow diagram 400 is shown illustrating one mechanism for determining when one or more search results can be accompanied with referencing information. At step 410, the user can enter one or more terms, characters, words, or other information into the search field 211 and initiate a search. The search code 44 can search the database 50 at step 420 to identify those pages that match the search terms. The search code 44 can further sort the identified pages at step 430 so as to provide the most relevant pages to the user.

Once the relevant pages have been identified and sorted, the snippet generator 45 can, at step 440, search the database 50 to identify an excerpt from the relevant pages to be displayed along with those pages as search results to the user. At step 450, the snippet generator 45 can verify that the selected snippet contains at least some of the search terms entered by the user. If such a verification can be made, then the front end can generate the search results page, as shown at step 490. In an alternative embodiment, not illustrated in FIG. 5, if the selected snippet does not contain all of the search terms entered by the user, step 480 can be performed to provide referencing information that provides some or all of the search terms not contained in the snippet or in the result page itself.

However, if at step 450, the snippet generator cannot generate a snippet that contains any of the search terms, it can attempt to generate a query-independent snippet at step 460. As explained previously, a page hosting one or more controls may comprise little or no text from which a snippet can be generated. Additionally, a page may be referenced by other pages in such a manner that it appears relevant to the user's search query, but the page itself may not contain any of the terms of the user's query. In such cases, a query-independent snippet, such as the title of the page, or the address of the page, may be generated by the snippet generator at step 470, based upon the determination at step 460. If, at step 460, the snippet generator determines that it cannot generate a query-independent snippet, then it can skip over step 470 and proceed directly to step 480.

As shown in FIG. 5, if a snippet containing the search terms cannot be generated at step 450, then, at step 480, an identification can be made regarding the display of referencing information, such as one or more anchor texts that are used to reference the page deemed relevant to the user's query, and the page or pages using those anchor texts. As indicated previously, an alternative embodiment contemplates that referencing information can be displayed even if a snippet containing the some or all of the search terms could be generated at step 450. The identification of which referencing information to display can be based on one or more factors. In addition, the weights assigned to each factor, and the factors themselves, can be adjusted based on empirical evidence and user testing.

Figure 6:
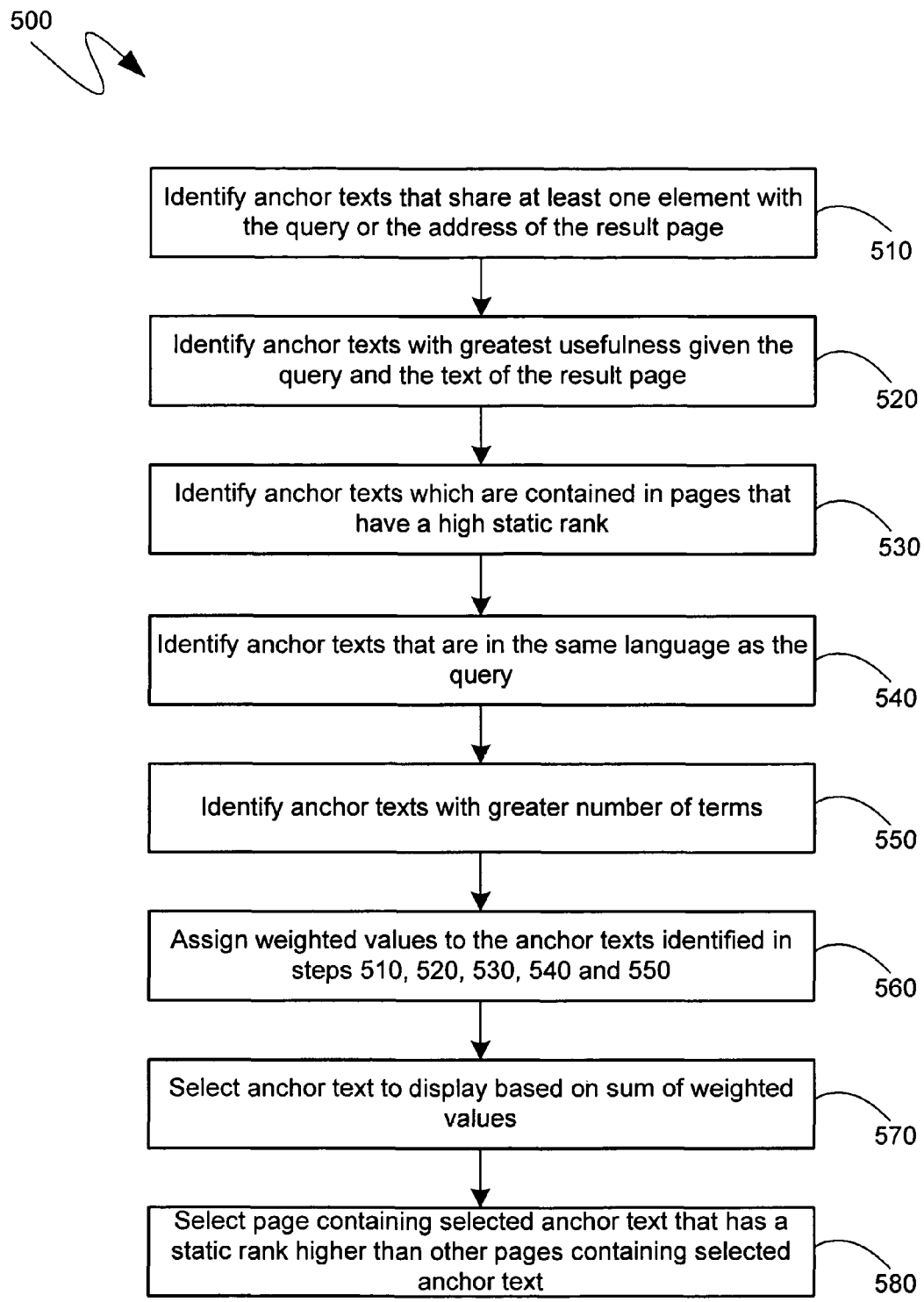
FIG. 6 is a flowchart illustrating an exemplary process for selecting referencing information to display.

Turning to FIG. 6, the consideration of factors in the determination of which anchor text wording and which referencing page or pages to use is illustrated with reference to flow diagram 500. More specifically, FIG. 6 illustrates one mechanism by which the anchor text wording to be displayed can be chosen from among select referencing information, including anchor texts, that were stored with the page that is now deemed to be a search result corresponding to the user's query.

At step 510, anchor texts from among those stored with the web page being proffered as a search result can be parsed for those that share at least one element with the user's query. Such an element can be a word, though it can likewise be any discrete collection of one or more characters, irrespective of linguistic rules. A further similarity that can also be considered in the identification performed at step 510 is the equivalence between any element of the anchor text and the address of the page deemed relevant to the user's query. Step 520 can identify and sort, according to their overall usefulness given the user's query and the text of the page deemed to be a search result, the anchor text wordings that were stored with that page. For example, if the search result page comprises some, but not all, of the terms used in the search query, and one of the stored anchor text wordings comprises the remaining terms of the search query that are not used by the result page, then such an anchor text wording can be deemed more useful and can be ranked accordingly. Usefulness can also comprise similarity, such that the anchor text wordings that were stored with the result page are ordered based on factors including the number of terms they share with the search query, the order of those terms, and the like.

Anchor text wordings which are used by pages having a high static rank can be identified at step 530. At step 540, the previously stored anchor texts can be reviewed to identify those that are in the same language as the user's query. In one embodiment, a pre-check can be made prior to performing step 540 to verify that the user's query is actually in a particular language and not, for example, an alphanumerical query for a serial number. At step 550, anchor text wordings that simply have more terms can be identified, with the expectation that a greater number of terms provides more context for the user.

At step 560, the various identifications performed at steps 510 through 550 can be ranked and assigned weights. For example, the anchor texts with the greatest similarity to the query, as determined at step 520, can be assigned a greater numerical value, while those with less similarity to the query can be assigned a lower numerical value. Subsequently, the assigned numerical value can be multiplied by a weighting value designed to apply a greater weight to those factors that most influence the provision of results that are deemed useful by users. In one embodiment the weighting values assigned to each factor can be continuously revised in response to user feedback.

Once the factors have been assigned values, and have been weighted accordingly, the anchor text to be displayed can be selected at step 570 based on the largest summed values of the weighted factors. The combination of the weighted factors can be termed the "dynamic rank" of the page. In one embodiment, only a single anchor text is selected, while other embodiments contemplate the selection of multiple anchor text wordings for display to the user. For each anchor text wording selected, at step 580, the page with which that anchor text will be associated can be selected based on static rank. Thus, a user selection of the displayed anchor text will direct the user to the page which uses that anchor text to link to the page deemed relevant to the user's query, and which has a higher static rank than all of the other pages that were identified as using the same anchor text wording to also link to the page deemed relevant to the user's query.

As can be seen from the above descriptions, referencing information can be selected for display to the user in order to provide further context for search results for which a snippet with the search terms is not generated. In view of the many possible variations of the subject matter described herein, we claim as our invention all such embodiments as may come within the scope of the following claims and equivalents thereto.

We claim:

1. One or more computer-readable media, the one or more computer-readable media not consisting of a propagating signal, the one or more computer-readable media comprising computer-executable instructions for providing search results, the computer-executable instructions directed to steps comprising:
   receiving, by a search engine, a search string comprising search terms;
   identifying pages relevant to the search string;
   for each of the identified pages relevant to the search string:
      obtaining a snippet for the corresponding identified page, the snippet is an excerpt from the corresponding identified page, the snippet, generated by searching a database, illustrates relevance of the corresponding identified page to the search string;

determining that the snippet does not contain search terms of the search string, obtaining reference information comprising first anchor text of a link to the corresponding identified page from a web page other than the corresponding identified page, the first anchor text is used by the web page other than the corresponding identified page to reference the corresponding identified page; and displaying links to each identified page with the snippet and the obtained reference information for the identified page, wherein the reference information further comprises a second anchor text used by another page to link to the at least one of the identified pages, wherein the second anchor text is different from the first anchor text, and wherein the second anchor text is relevant to the search string.

2. The computer-readable media of claim 1, wherein the referencing information further comprises a link to at least one referencing page using the first anchor text to link to the at least one of the identified pages.

3. The computer-readable media of claim 2 comprising further computer-executable instructions directed to selecting the at least one referencing page based in part on a static rank of one or more referencing pages, the one or more referencing pages using the first anchor text to link to the at least one of the identified pages.

4. The computer-readable media of claim 1 comprising further computer-executable instructions directed to selecting the first anchor text from among multiple anchor text wordings based in part on similarity between the first anchor text and the search string.

5. The computer-readable media of claim 1 comprising further computer-executable instructions directed to selecting the first anchor text from among multiple anchor text wordings based in part on a static rank of one or more referencing pages, the one or more referencing pages using the first anchor text to link to the at least one of the identified pages.

6. The computer-readable media of claim 1 comprising further computer-executable instructions directed to selecting the first anchor text from among multiple anchor text wordings based in part on similarity between the search string and a combination of elements present in the at least one of the identified pages and elements present in the first anchor text.

7. The computer-readable media of claim 1 comprising further computer-executable instructions directed to providing a query-independent snippet for the at least one of the identified pages if the at least one of the identified pages does not comprise elements contained in the search string in a snippetizable format, wherein the query-independent snippet identifies the at least one of the identified pages.

8. A method of delivering search results comprising:

using a computing device, receiving, by a search engine, a search string comprising search terms;

using the computing device, identifying pages relevant to the search string;

using the computing device, for each of the identified pages relevant to the search string:

obtaining a snippet for the corresponding identified page, the snippet is an excerpt from the corresponding identified page, the snippet, generated by searching a database, illustrates relevance of the corresponding identified page to the search string;

determining that the snippet does not contain search terms of the search string, obtaining reference information comprising first anchor text of a link to the corresponding identified page from a web page other than the corresponding identified page, the first anchor text is used by the web page other than the corresponding identified page to reference the corresponding identified page; and displaying links to each identified page with the snippet and the obtained reference information for the identified page, wherein the reference information further comprises a second anchor text used by another page to link to the at least one of the identified pages, wherein the second anchor text is different from the first anchor text, and wherein the second anchor text is relevant to the search string.

9. The method of claim 8, wherein the referencing information further comprises a link to at least one referencing page using the first anchor text to link to the at least one of the identified pages.

10. The method of claim 9 further comprising selecting the at least one referencing page based in part on a static rank of one or more referencing pages, the one or more referencing pages using the first anchor text to link to the at least one of the identified pages.

11. The method of claim 8 further comprising selecting the first anchor text from among multiple anchor text wordings based in part on similarity between the first anchor text and the search string.

12. The method of claim 8 further comprising selecting the first anchor text from among multiple anchor text wordings based in part on a static rank of one or more referencing pages, the one or more referencing pages using the first anchor text to link to the at least one of the identified pages.

13. The method of claim 8 further comprising selecting the first anchor text from among multiple anchor text wordings based in part on similarity between the search string and a combination of elements present in the at least one of the identified pages and elements present in the first anchor text.

14. The method of claim 8 further comprising providing a query-independent snippet for the at least one of the identified pages if the at least one of the identified pages does not comprise elements contained in the search string in a snippetizable format, wherein the query-independent snippet identifies the at least one of the identified pages.

15. A system for providing search results, the system comprising:

a computing device coupled to a memory, the memory storing computer-executable instructions to:

receive, by a search engine, a search string comprising search;

identify pages relevant to the search string;

for each of the identified pages relevant to the search string:

obtain a snippet for the corresponding identified page, the snippet is an excerpt from the corresponding identified page, the snippet, generated by searching a database, illustrates relevance of the corresponding identified page to the search string;

determine that the snippet does not contain search terms of the search string, obtaining reference information comprising first anchor text of a link to the corresponding identified page from a web page other than the corresponding identified page, the first anchor text is used by the web page other than the corresponding identified page to reference the corresponding identified page; and display links to each identified page with the snippet and the obtained reference information for the identified page, wherein the reference information further comprises a second anchor text used by another page to link to the at least one of the identified pages, wherein the second anchor text is different from the first anchor text, and wherein the second anchor text is relevant to the search string.

16. The system of claim 15, wherein the referencing information further comprises a link to at least one referencing page using the first anchor text to link to the at least one of the identified pages.

17. The system of claim 16, the memory further storing computer-executable instructions to select the at least one referencing page based in part on a static rank of one or more referencing pages, the one or more referencing pages using the first anchor text to link to the at least one of the identified pages.

18. The system of claim 15, the memory further storing computer-executable instructions to select the first anchor text from among multiple anchor text wordings based in part on similarity between the first anchor text and the search string.

19. The system of claim 15, the memory further storing computer-executable instructions to select the first anchor text from among multiple anchor text wordings based in part on a static rank of one or more referencing pages, the one or more referencing pages using the first anchor text to link to the at least one of the identified pages.

20. The system of claim 15, the memory further storing computer-executable instructions to select the first anchor text from among multiple anchor text wordings based in part on similarity between the search string and a combination of elements present in the at least one of the identified pages and elements present in the first anchor text.

* * * * *